United States Patent

Takahashi (10) Patent No.: US 9,595,892 B2
(45) Date of Patent: Mar. 14, 2017

(54) ELECTROSTATIC ACTUATOR (75) Inventor: Norio Takahashi, Kita-Ku (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 548 days.

(21) Appl. No.: 13/639,017

(22) PCT Filed: Apr. 28, 2011

(86) PCT No.: PCT/JP2011/060425
§ 371 (c)(1),
(2), (4) Date: Oct. 2, 2012

(87) PCT Pub. No.: WO2011/148758
PCT Pub. Date: Dec. 1, 2011

(65) Prior Publication Data
US 2013/0026879 A1    Jan. 31, 2013

(30) Foreign Application Priority Data

May 28, 2010    (JP) .................................. 2010-122637

(51) Int. Cl.
*H02N 1/00*    (2006.01)
*H02N 3/00*    (2006.01)

(52) U.S. Cl.
CPC ............... *H02N 1/004* (2013.01); *H02N 1/00* (2013.01); *H02N 3/00* (2013.01)

(58) Field of Classification Search
CPC ............. H02N 1/00; H02N 3/00; H02N 1/004
USPC ................................................ 310/300, 309
See application file for complete search history.

(56) References Cited

U.S. PATENT DOCUMENTS

| 5,461,272 A * | 10/1995 | Matsumoto ............ H02N 1/004 310/12.03 |
| 7,851,968 B2 * | 12/2010 | Chaillout et al. ............. 310/309 |
| 7,868,516 B2 * | 1/2011 | Takahashi .............. H02N 1/004 310/309 |
| 8,089,194 B2 | 1/2012 | Naruse et al. |
| 8,283,834 B2 * | 10/2012 | Matsubara ............... H02N 1/08 310/12.01 |
| 2003/0102771 A1 | 6/2003 | Akiba et al. |

(Continued)

FOREIGN PATENT DOCUMENTS

| CN | 101529712 A | 9/2009 |
| JP | 05-022959 A1 | 1/1993 |

(Continued)

OTHER PUBLICATIONS

International Search Report dated Jun. 21, 2011.
(Continued)

*Primary Examiner* — Dang Le
*Assistant Examiner* — Leda Pham
(74) *Attorney, Agent, or Firm* — Burr & Brown, PLLC (57) ABSTRACT

An electrostatic actuator 100 includes: a stator 1 that includes a substrate 102 and a plurality of linear electrodes 1a to 1d separately provided on the substrate 102 and arranged in parallel; and a movable element 2 disposed on the linear electrodes 1a to 1d of the stator 1. Multiple projecting elements 104b are provided at regular intervals on a surface of the stator 1 so as to face the movable element 2, forming a mat surface. A smooth layer 105 is formed on a surface of the movable element 2 so as to face the mat surface.

16 Claims, 6 Drawing Sheets

(56) References Cited

U.S. PATENT DOCUMENTS

| | | | | |
|---|---|---|---|---|
| 2005/0162036 A1* | 7/2005 | Odaka | ............... | H02N 1/004 |
| | | | | 310/309 |
| 2005/0212382 A1* | 9/2005 | Odaka | ............... | H02N 1/004 |
| | | | | 310/309 |
| 2010/0066203 A1* | 3/2010 | Takeuchi | ............ | H02N 1/006 |
| | | | | 310/300 |

FOREIGN PATENT DOCUMENTS

| | | |
|---|---|---|
| JP | 09-121562 | 5/1997 |
| JP | 2000-143024 A1 | 5/2000 |
| JP | 2001-178153 A1 | 6/2001 |
| JP | 2003-136496 A1 | 5/2003 |
| JP | 2006-067734 A1 | 3/2006 |
| JP | 2009-225563 A1 | 10/2009 |

OTHER PUBLICATIONS

Japanese Office Action (Application No. 2010-122637) dated Jan. 21, 2014 (with English translation).
Chinese Office Action (With English Translation), Chinese Application No. 201180026504.5, dated Jun. 30, 2014 (12 pages).

* cited by examiner

ELECTROSTATIC ACTUATOR

FIELD OF THE INVENTION

The present invention relates to electrostatic actuators.

BACKGROUND ART

A conventionally known electrostatic actuator includes a stator that is provided with electrodes and a movable element that is disposed on the stator and has a resin substrate and a resistive film provided on the resin substrate.

In such an electrostatic actuator, the stator and the movable element are moved while the surfaces of the stator and the movable element are bonded to each other, leading to larger friction resistance between the stator and the movable element.

Hence, a conventional electrostatic actuator has a rough surface that is formed by fixing conductive beads with an insulating binder on the top surface of a stator, and a smooth surface on the back side of a movable element opposed to the rough surface (for example, JP09-121562).

However, printing or coating of ink (paint) containing beads is likely to cause clogging and a liquid containing beads is likely to coagulate, increasing the occurrence of irregularities on the rough surface.

In the case of a small amount of beads, convex portions are widely spaced with distortion on a film, increasing a flat contact area between the rough surface and the smooth surface. In the case of a large amount of beads, curling is likely to occur with more convex portions in contact with the smooth surface, leading to larger friction resistance.

In the case where the thickness of the insulating binder (resin layer) for fixing beads is smaller than a predetermined value, beads are likely to drop off, whereas in the case where the thickness of the insulating binder is larger than the predetermined value, beads are covered with the insulating binder, precluding the formation of predetermined concave and convex portions on the rough surface.

In other words, in the conventional electrostatic actuator, the concave and convex portions have low uniformity in the plane of the rough surface using conductive beads, unfortunately leading to a local increase in friction resistance between the stator and the movable element.

SUMMARY OF THE INVENTION

The present invention has been devised in view of this problem. An object of the present invention is to provide an electrostatic actuator that can reduce friction resistance between a stator and a movable element.

An electrostatic actuator according to one aspect of the invention, comprising:

a stator that includes a substrate and electrodes provided on the substrate; and a movable element disposed on a surface of the stator with the electrodes disposed on the surface, wherein the electrostatic actuator further comprises:

multiple projecting elements equally spaced on a surface of the stator so as to face the movable element or on a surface of the movable element so as to face the stator; and a smooth layer formed on the surface of the movable element or the surface of the stator so as to face the multiple projecting elements.

In the electrostatic actuator, the electrodes are a plurality of linear electrodes that are separately provided on the substrate and are arranged in parallel, and the multiple projecting elements may be multiple linear projecting elements.

In the electrostatic actuator, the linear projecting elements are extended perpendicularly to the plurality of linear electrodes.

In the electrostatic actuator, the multiple projecting elements may be conical elements.

The electrostatic actuator may comprise a first additional smooth layer at least in a part other than the multiple projecting elements on the surface of the stator or the surface of the movable element.

The electrostatic actuator comprises a second additional smooth layer formed on surfaces of the multiple projecting elements.

In the electrostatic actuator, the multiple projecting elements are made of a conductive material.

In the electrostatic actuator, the smooth layer is made of carbon-containing silica.

The electrostatic actuator according to the present invention includes multiple projecting elements that are equally spaced on a surface of the stator so as to face the movable element or on a surface of the movable element so as to face the stator, and a smooth layer that is formed on the surface of the movable element or the stator so as to face the multiple projecting elements.

Thus, as compared with the conventional art, in-plane variations in the distribution of the projecting elements can be reduced, suppressing a local increase in friction resistance between the stator and the movable element.

In other words, friction resistance between the stator and the movable element can be reduced.

DETAILED DESCRIPTION OF THE INVENTION

An embodiment of an electrostatic actuator according to the present invention will be described below with reference to the accompanying drawings.

Figure 1:
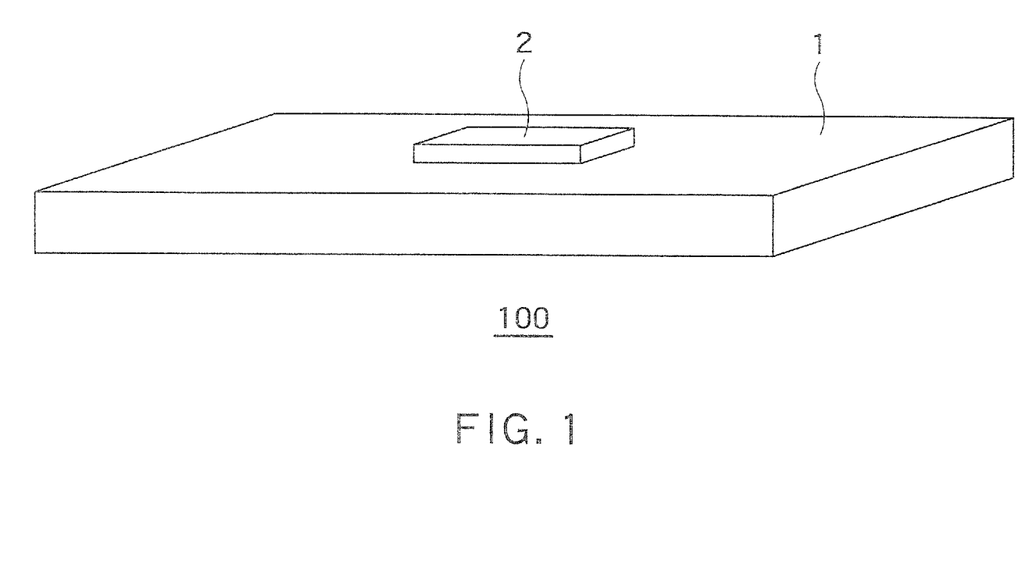
FIG. 1 is a perspective view illustrating an example of the configuration of an electrostatic actuator 100 according to the present invention.
Figure 2:
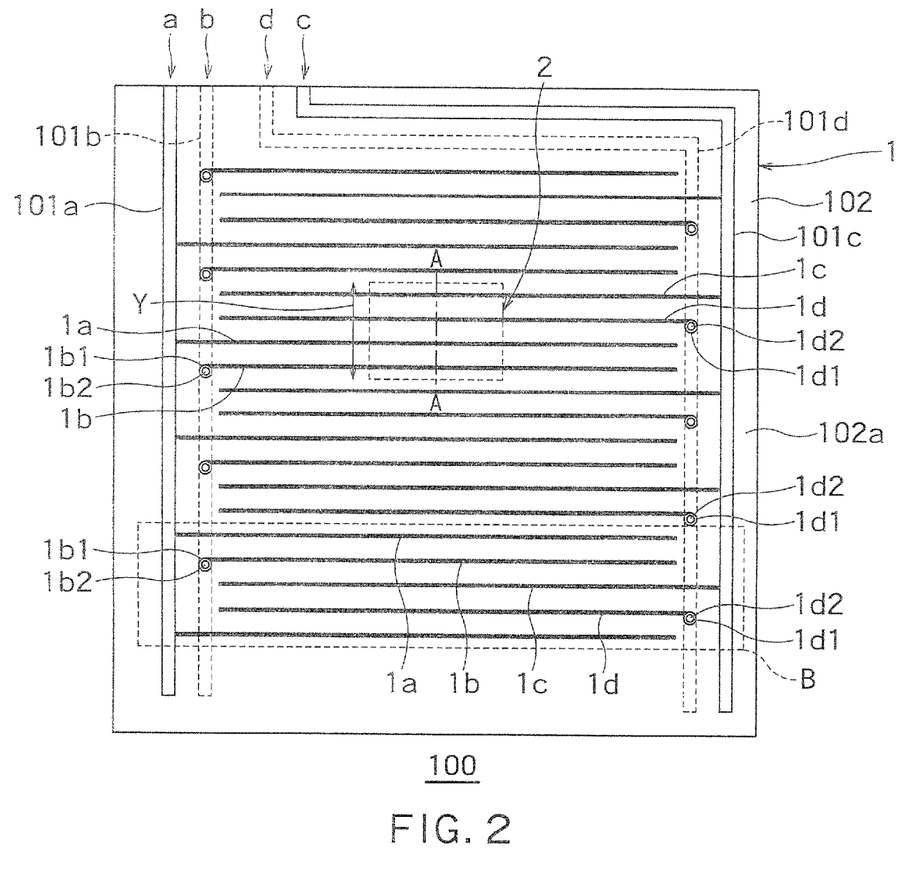
FIG. 2 is a top view schematically illustrating the electrostatic actuator 100 of FIG. 1.
Figure 3:
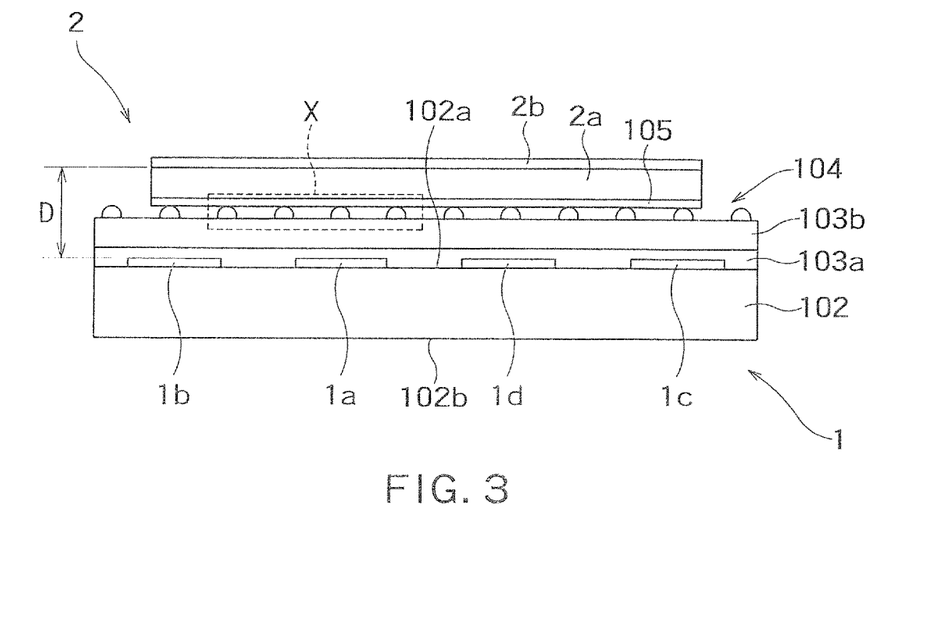
FIG. 3 is a cross-sectional view illustrating an example of a cross section of the electrostatic actuator 100 viewed along line A-A of FIG. 2.

FIG. 1 is a perspective view illustrating an example of the configuration of an electrostatic actuator 100 according to the present invention. FIG. 2 is a top view schematically illustrating the electrostatic actuator 100 of FIG. 1. FIG. 3 is a cross-sectional view illustrating an example of a cross section of the electrostatic actuator 100 viewed along line A-A of FIG. 2.

For simplification, an adhesive layer 103a, a cover film 103b, and a sliding structure 104 are omitted in FIG. 2.

As illustrated in FIGS. 1 to 3, the electrostatic actuator 100 includes a stator 1 that is provided with a substrate 102 having one surface 102a and another surface 102b and a plurality of linear electrodes 1a to 1d that are separately provided on the one surface 102a of the substrate 102 and are arranged in parallel at regular intervals, and a movable element 2 that is movably placed on the linear electrodes 1a to 1d of the stator 1.

Signals a to d for driving the movable element 2 are inputted to the four-wire electrostatic actuator 100 from a drive circuit (not shown). At this point, the signals a to d are applied to the respective linear electrodes 1a to 1d through bus lines 101a to 101d, through-hole wires 1b2 and 1d2, and pad electrodes 1b1 and 1d1.

The stator 1 will be specifically described below. As described above, the stator 1 includes the substrate 102 and the conductive linear electrodes 1a to 1d provided on the one surface 102a of the substrate 102.

The first bus line 101a and the second bus line 101b are provided in parallel on one side (the left side in FIG. 2) of the linear electrodes 1a to 1d. The first bus line 101a and the second bus line 101b are extended perpendicularly to the linear electrodes 1a to 1d and are connected to the linear electrodes 1a and 1b, respectively. The third bus line 101c and the fourth bus line 101d are provided in parallel on the other side (the right side in FIG. 2) of the linear electrodes 1a to 1d. The third bus line 101c and the fourth bus line 101d are extended perpendicularly to the linear electrodes 1a to 1d and are connected to the linear electrodes 1c and 1d, respectively.

The adhesive layer 103a and the cover film 103b are provided over the linear electrodes 1a to 1d provided on the one surface 102a of the substrate 102. The sliding structure 104 is provided over the cover film 103.

The substrate 102 is, for example, 25 μm in thickness. A material used for the substrate 102 is selected from, for example, polyimide, glass epoxy resin, phenol resin, PET (polyethylene terephthalate), PET-G (terephthalic acid-cyclohexanedimethanol-ethylene glycol copolymer), PEN (polyethylene naphthalate), PP (polypropylene), PE (polyethylene), PC (polycarbonate), PA (polyamide), PPS (polyphenylene sulfide), polyvinyl chloride, vinyl chloride-vinyl acetate copolymer, cellulose diacetate, cellulose triacetate, polystyrenes, ABS, polyacrylic ester, polyethylene, and polyurethane. Particularly, polyimide and PEN are preferable because of its high thermal resistance and strength.

As described above, the linear electrodes 1a to 1d are separately provided on the one surface 102a of the substrate 102 and are repeatedly arranged in parallel like comb teeth at regular intervals. For example, the linear electrodes 1a to 1d are set with wiring pitches of 0.3 mm or less. The linear electrodes 1a to 1d are about 18 μm in thickness when an electrode material used on a polyimide substrate is, for example, Cu, whereas the linear electrodes 1a to 1d are about 1500 Å in thickness (see FIGS. 2 and 3) when an electrode material formed on the substrate is ITO (indium tin oxide).

The two first and second bus lines 101a and 101b are shaped like belts and are provided, as described above, on one side (the left side in FIG. 2) of the linear electrodes 1a to 1d.

The first bus line 101a is provided on the one surface (top surface) 102a of the substrate 102 and is electrically connected to the linear electrodes 1a.

The second bus line 101b is provided on the other surface (undersurface) 102b of the substrate 102 and is electrically connected to the linear electrode 1b. The substrate 102 further includes the through-hole wires 1b2 that penetrate the substrate 102 and are connected to the second bus line 101b provided on the other surface 102b of the substrate 102. The one surface 102a of the substrate 102 also has pad electrodes 1b1, each connecting one side of the linear electrode 1b and the through-hole wire 1b2.

Thus, the second bus line 101b is electrically connected to the linear electrode 1b.

The two third and fourth bus lines 101c and 101d are shaped like belts and are provided, as described above, on the other side (the right side in FIG. 2) of the linear electrodes 1a to 1d.

The third bus line 101c is provided on the one surface (top surface) 102a of the substrate 102 and is electrically connected to the linear electrodes 1c.

The fourth bus line 101d is provided on the other surface (undersurface) 102b of the substrate 102 and is electrically connected to the linear electrodes 1d. The substrate 102 includes the through-hole wires 1d2 that penetrate the substrate 102 and are connected to the fourth bus line 101d provided on the other surface 102b of the substrate 102. The one surface (top surface) 102a of the substrate 102 has the pad electrodes 1d1, each connecting one side of the linear electrode 1d and the through-hole wire 1d2.

Thus, the fourth bus line 101d is electrically connected to the linear electrodes 1d.

Referring to FIG. 3, the adhesive layer 103a, the cover film 103b, and the sliding structure 104 of the stator 1 will be specifically described below.

As illustrated in FIG. 3, the adhesive layer 103a is provided on the substrate 102 so as to cover the linear electrodes 1a to 1d.

The cover film 103b is provided on the adhesive layer 103a. A material used for the cover film 103 is, for example, polyimide.

Figure 4:
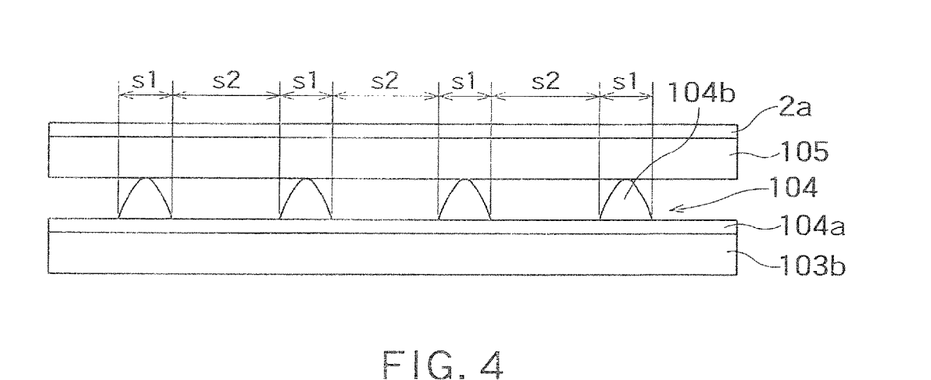
FIG. 4 is a cross-sectional view illustrating an example of an enlarged region containing the sliding structure 104 surrounded by a region X of FIG. 3.

The sliding structure 104 is provided on the cover film 103. As illustrated in FIG. 4, the sliding structure 104 includes an additional smooth layer 104a and multiple projecting elements 104b and is slidable on the undersurface (a smooth layer 105, which will be described later) of the movable element 2.

Figure 5:
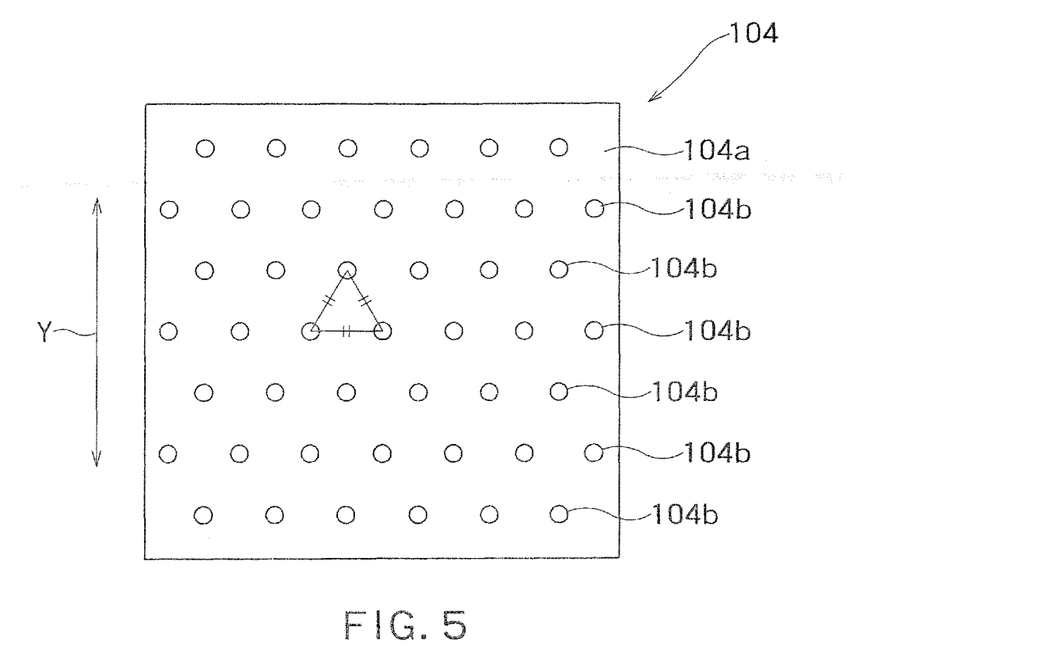
FIG. 5 is a top view illustrating an example of the configuration of the sliding structure 104 viewed from above.
Figure 6:
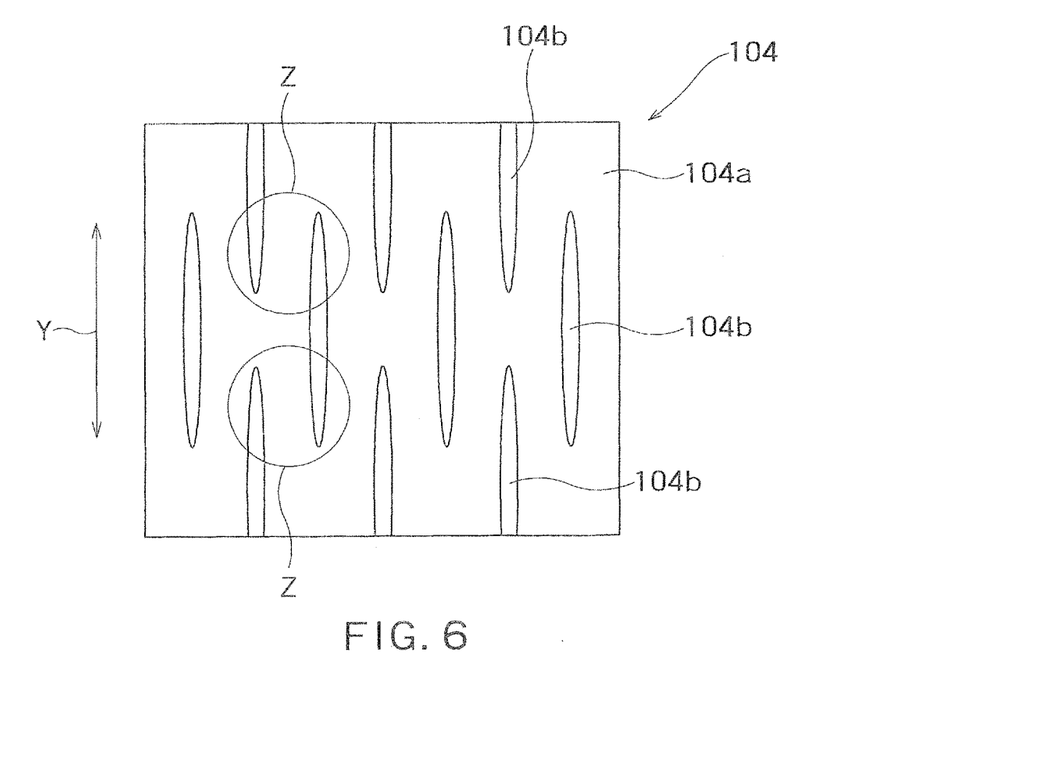
FIG. 6 is a top view illustrating another example of the configuration of the sliding structure 104 viewed from above.

FIG. 4 is a cross-sectional view illustrating an example of an enlarged region containing the sliding structure 104 surrounded by a region X of FIG. 3. FIG. 5 is a top view illustrating an example of the configuration of the sliding structure 104 viewed from above. FIG. 6 is a top view illustrating another example of the configuration of the sliding structure 104 viewed from above.

As illustrated in FIG. 4, the additional smooth layer 104a is provided on the cover film 103b.

A material used for the additional smooth layer 104a is, for example, conductive carbon-containing silica. The additional smooth layer 104a is formed by, for example, evaporation.

The multiple projecting elements 104b are provided on the additional smooth layer 104a. The multiple projecting elements 104b are conical elements (FIGS. 4 and 5).

The projecting elements 104*b* may have other shapes. For example, as illustrated in FIG. 6, the multiple projecting elements 104*b* may be multiple linear projecting elements. Particularly, the linear projecting elements are extended in a direction Y perpendicular to the plurality of linear electrodes 1*a* to 1*d* (arranged like mountains).

Thus, meandering of the movable element 2 can be suppressed, and peeling of the projecting elements 104*b* can be also suppressed.

The multiple projecting elements 104*b* is formed by printing such as gravure printing, screen printing, offset printing, flexographic printing, and ink jet printing. The projecting elements 104*b* formed by printing at higher cost are preferably provided on the stator 1 that is expensive and reusable. The projecting elements 104*b* provided on the movable element 2 will be described later in a modification.

Since the multiple projecting elements 104*b* are formed by printing, the projecting elements 104*b* are arranged with, for example, an equal width s1 and the adjacent projecting elements 104*b* are spaced at an equal interval s2, thereby reducing in-plane variations in the distribution of the projecting elements 104*b* and suppressing a local increase in friction resistance between the stator and the movable element.

The width s1 of the projecting element 104*b* and the interval s2 between the adjacent projecting elements 104*b* can be measured on an observation image obtained by observing the top surface of the sliding structure 104 with an optical microscope.

The width s1 of each of the linear projecting elements 104*b* in FIG. 6 is a mean value of widths measured by the measuring method at any points.

The interval s2 between the adjacent projecting elements 104*b* of the multiple linear projecting elements in FIG. 6 is a mean value of widths measured by the measuring method at any points in overlap regions Z containing the adjacent projecting elements.

The distribution of the projecting elements 104*b* ranges from, for example, 1 to 3000/cm$^2$. In the distribution of an extremely small number of projecting elements 104*b*, a mat effect is lessened, whereas in the distribution of an extremely large number of projecting elements, friction resistance increases. Hence, the density of the projecting elements 104*b* in the plane of the stator 1 is set according to desired conditions.

In the case where the multiple projecting elements 104*b* are conical elements, it is particularly preferable to distribute the projecting elements 104*b* in triangular lattices as illustrated in FIG. 5. In a triangular lattice layout, all the adjacent projecting elements 104*b* are evenly spaced, leading to smaller in-plane variations in the distribution of the projecting elements.

The height of the projecting element 104*b* is set at, for example, 5 µm to 30 µm. In the case where the projecting elements 104*b* are too short, the stator 1 and the movable element 2 are likely to come into surface contact with each other between the adjacent two projecting elements 104*b*, increasing a friction coefficient. In the case where the projecting elements 104*b* are too tall, an electrostatic effect is lessened. Thus, the height of the projecting element 104*b* is set according to desired conditions.

In a conventional electrostatic actuator, the top surface of a stator is a rough surface on which conductive beads are fixed with an insulating binder, and the back side of a movable element opposed to the rough surface has a smooth surface. In this case, the insulating binder for fixing the beads needs to have a larger thickness than the radius of the bead. For example, in the case where a projecting portion formed by a bead is 20 µm in height, the beads need to be at least 40 µm in particle size (diameter).

Such a conventional electrostatic actuator has a large distance from the top surfaces of electrodes of the stator to the charged surface of the movable element, reducing an electrostatic force. In contrast, the multiple projecting elements 104*b* according to the present invention are formed by printing. Thus, for example, in the case where the projecting elements 104*b* are 20 µm in height, only a thickness of 20 µm is necessary. For this reason, as compared with the conventional electrostatic actuator, a distance from the top surfaces of the electrodes of the stator to the charged surface of the movable element can be reduced, increasing an electrostatic force.

In this configuration, in order to increase the slidability of the movable element 2, the sliding structure 104 having the multiple equally spaced projecting elements 104*b* is formed on a surface of the stator 1 so as to face the movable element 2. Hence, a contact area between the stator 1 and the movable element 2 is reduced, leading to lower friction resistance.

The projecting elements 104*b* are made of a conductive material. A material used for the projecting elements 104*b* is selected from conductive resins such as polyacethylene, polythiophene, polyparaphenylene, polyaniline, polyparaphenylene vinylene, polypyrrole, polyacene, sulfonated polyaniline, polyphenylene vinylene, and polyethylenedioxythiophene (PEDOT) and conductive paste containing fillers of silver, gold, copper, nickel, aluminum, carbon, and graphite (binders include epoxy, polyester, polyurethane, polypropylene, silicone, acryl, and polyimide). Thus, an increase in the charge of the movable element 2 can be prevented.

Figure 7:
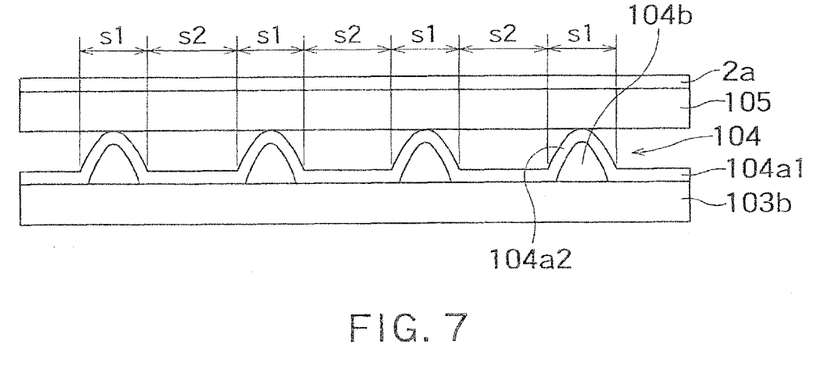
FIG. 7 is a cross-sectional view illustrating another example of an enlarged region containing the sliding structure 104 surrounded by the region X of FIG. 3.

FIG. 7 is a cross-sectional view illustrating another example of an enlarged region containing the sliding structure 104 surrounded by the region X of FIG. 3.

As illustrated in FIG. 7, an additional smooth layer 104*a*1 is provided on the cover film 103*b*. In other words, in the sliding structure 104, the additional smooth layer 104*a*1 is formed at least in a part other than the multiple projecting elements 104*b*. A material used for the additional smooth layer 104*a*1 is, for example, conductive carbon-containing silica.

Furthermore, additional smooth layers 104*a*2 are also formed on the surfaces of the multiple projecting elements 104*b*. A material used for the additional smooth layers 104*a*2 is, for example, conductive carbon-containing silica.

The additional smooth layer 104*a*1 and the additional smooth layers 104*a*2 are formed by, for example, evaporation.

Referring to FIGS. 1 and 2, the movable element 2 will be specifically described below. As illustrated in FIGS. 1 and 2, the movable element 2 is disposed on the stator 1. As illustrated in FIG. 3, the movable element 2 includes a resin substrate 2*a* opposed to the stator 1, a resistive film 2*b* provided on the resin substrate 2*a*, and the smooth layer 105 provided under the resin substrate 2*a*.

In other words, the smooth layer 105 is formed on a surface of the movable element 2 so as to face the sliding structure 104. The smooth layer 105 is made of, for example, carbon-containing silica. Particularly, the smooth layer 105 is formed by, for example, evaporation. The smooth layer 105 is formed by evaporation so as to be fixed on the resin substrate 2*a*, preventing offsetting of the rolled or stacked smooth layer 105 during storage. Furthermore, higher resistance to abrasion can be achieved.

The resin substrate 2a is opposed to the stator 1. For example, the resin substrate 2a has a thickness of about 50 µm.

A material used for the resin substrate 2a is selected from, for example, PET (polyethylene terephthalate), PET-G (terephthalic acid-cyclohexanedimethanol-ethylene glycol copolymer), PEN (polyethylene naphthalate), PP (polypropylene), PE (polyethylene), PC (polycarbonate), PA (polyamide), PPS (polyphenylene sulfide), polyvinyl chloride, vinyl chloride-vinyl acetate copolymer, cellulose diacetate, cellulose triacetate, polystyrenes, ABS, polyacrylic ester, polyethylene, and polyurethane. Particularly, PET is preferable because of its low cost, and PEN is preferable because of its high thermal resistance and strength.

As described above, the resistive film 2b is provided on the resin substrate 2a. The resistive film 2b is, for example, about 1 µm in thickness. Moreover, the resistive film 2b has a surface resistivity of, for example, $10^{11}$ to $10^{13}$ Ω/sq.

A distance D from the top surfaces of the linear electrodes (driving electrodes) 1a to 1d to the charged surface (undersurface) of the resistive film 2b is set at, for example, 30 µm to 150 µm.

The operations of the electrostatic actuator 100 configured thus will be described below.

First, as illustrated in FIG. 2, the signals a to d are inputted from a driving circuit (not shown) to the electrostatic actuator 100. At this point, the signals a to d are applied through the bus lines 101a to 101d, the through-hole wires 1b2 and 1d2, and the pad electrodes 1b1 and 1d1 to the linear electrodes 1a to 1d, respectively.

Figure 8:
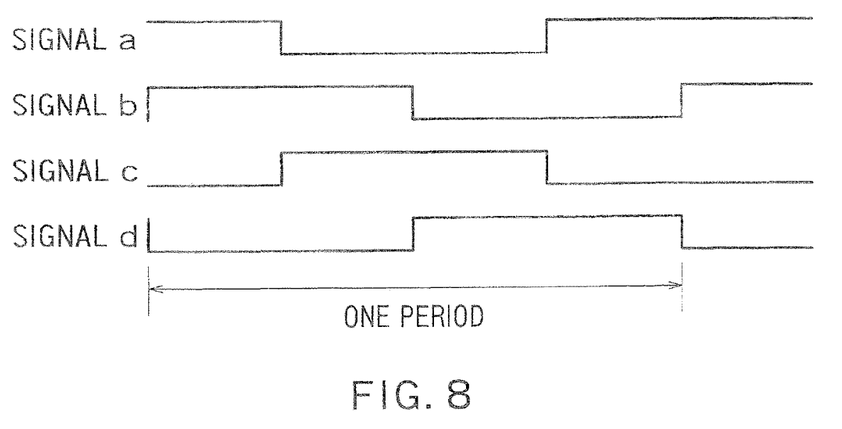
FIG. 8 is a waveform chart showing an example of the waveforms of the signals a to d applied to the linear electrodes 1a to 1d.

FIG. 8 is a waveform chart showing an example of the waveforms of the signals a to d applied to the linear electrodes 1a to 1d. In FIG. 8, the signals a to d have rectangular waves. Also in the case where the signals a to d have sine waves, the same phase relationship is established.

As shown in FIG. 8, the two signals a and b inputted to the adjacent linear electrodes 1a and 1b are shifted from each other by a quarter of a period. Similarly, the two signals b and c inputted to the adjacent linear electrodes 1b and 1c are shifted from each other by a quarter of a period. Also, the two signals c and d inputted to the adjacent linear electrodes 1c and 1d are shifted from each other by a quarter of a period.

Hence, the linear electrode 1a and the linear electrode 1c are fed with the signals a and c that are phase-shifted by a half period. The linear electrode 1b and the linear electrode 1d are fed with the signals b and d that are phase-shifted by a half period.

In this case, the resistive film 2b of the movable element 2 generates a charge in response to the signals a to d applied to the linear electrodes 1a to 1d. As the signals a to d fluctuate in voltage, the movable element 2 moves in the direction Y perpendicular to the linear electrodes 1a to 1d on the stator 1 (FIG. 2) before the charged part of the movable element 2 is discharged.

As described above, in the electrostatic actuator 100, the sliding structure 104 having the multiple equally spaced projecting elements 104b is formed on the surface of the stator 1 so as to face the movable element 2 while the smooth layer 105 is formed on the surface of the movable element 2 so as to face the sliding structure 104, thereby reducing in-plane variations in the distribution of the projecting elements and suppressing a local increase in friction resistance between the stator 1 and the movable element 2 as compared with the conventional art.

Particularly, as described above, a contact area between the stator 1 and the movable element 2 can be reduced and a smoothing effect can be improved. In other words, low friction resistance can be achieved.

Moreover, a space between the stator 1 and the movable element 2 reduces adhesion between the stator 1 and the movable element 2, increasing the movability of the movable element 2.

For example, in the case of a high humidity, a space is formed between the smooth layer 105 and the sliding structure 104, thereby preventing moisture from bonding the stator 1 and the movable element 2.

Moreover, even in a long-time operation, the conductive projecting elements 104b discharge electricity. Thus, the stator and the movable element are hardly charged (a charge hardly increases over the electrostatic actuator). This reduces adhesion between the stator and the movable element and increases the movability of the movable element.

Furthermore, the additional smooth layers 104a and 104a1 provided on faces between the projecting elements 104b can suppress an increase in friction resistance even if the movable element 2 partially comes into contact with the stator 1.

As described above, the electrostatic actuator according to the present embodiment can reduce friction resistance between the stator and the movable element.

[Modification]

In the above example, the projecting elements are provided on the stator and the smooth layer is provided on the movable element (FIG. 3).

The same effect can be obtained also in the case where the projecting elements are provided on the movable element and the smooth layer is provided on the stator.

The present modification will describe an example of the configuration of an electrostatic actuator in which projecting elements are provided on a movable element and a smooth layer is provided on a stator.

Figure 9:
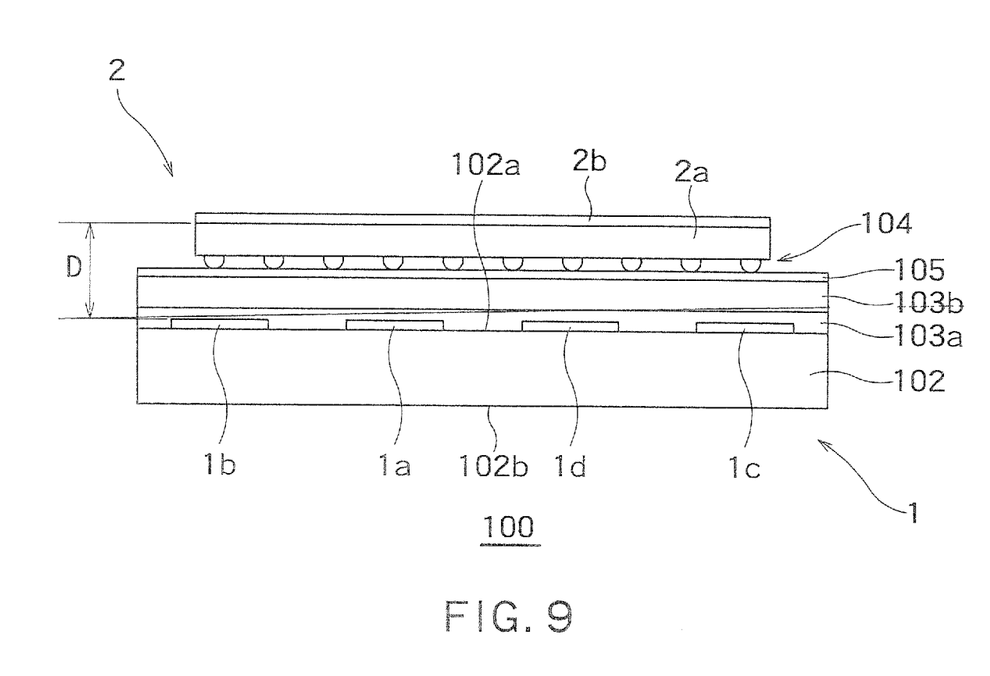
FIG. 9 is a cross-sectional view illustrating another example of a cross section of the electrostatic actuator 100 along line A-A of FIG. 2.

FIG. 9 is a cross-sectional view illustrating another example of a cross section of the electrostatic actuator 100 along line A-A of FIG. 2. In FIG. 9, the same reference numerals as in FIG. 3 indicate the same configurations as in the first embodiment. Moreover, the electrostatic actuator is identical in configuration to that of FIGS. 1 and 2. A sliding structure 104 and a smooth layer 105 are arranged in a different layout but are identical in configuration to those of FIGS. 4 and 7.

As illustrated in FIG. 9, a stator 1 includes a substrate 102, linear electrodes 1a to 1d, an adhesive layer 103a, a cover film 103b, and the smooth layer 105.

The adhesive layer 103a is provided on the substrate 102 so as to cover the linear electrodes 1a to 1d.

The cover film 103b is provided on the adhesive layer 103a. The smooth layer 105 is provided on the cover film 103b.

As illustrated in FIG. 9, a movable element 2 includes a resin substrate 2a opposed to the stator 1, a resistive film 2b provided on the resin substrate 2a, and the sliding structure 104 provided under the resin substrate 2a.

As in FIG. 4, the sliding structure 104 includes an additional smooth layer 104a and multiple projecting elements 104b. The sliding structure 104 is slidable on the top surface (smooth layer 105) of the stator 1.

In other words, in order to increase the slidability of the movable element 2, the sliding structure 104 having the multiple equally spaced projecting elements 104b is formed on a surface of the movable element 2 so as to face the stator 1. The smooth layer 105 is formed on a surface of the stator 1 so as to face the sliding structure 104.

Hence, a contact area between the stator 1 and the movable element 2 decreases, leading to lower friction resistance.

The electrostatic actuator configured thus operates as in the above example (FIG. 8). Specifically, the resistive film 2b of the movable element 2 is charged in response to signals a to d applied to the linear electrodes 1a to 1d. As the signals a to d fluctuate in voltage, the movable element 2 moves in a direction Y perpendicular to the linear electrodes 1a to 1d on the stator 1 (FIG. 2) before the charged part of the movable element 2 is discharged.

As described above, in the electrostatic actuator, the sliding structure 104 having the multiple equally spaced projecting elements is formed on the surface of the movable element 2 so as to face the stator 1 while the smooth layer 105 is formed on the surface of the stator 1 so as to face the sliding structure 104, thereby reducing in-plane variations in the distribution of the projecting elements and suppressing a local increase in friction resistance between the stator 1 and the movable element 2 as compared with the conventional art.

As described above, the electrostatic actuator according to the present modification can reduce friction resistance between the stator and the movable element.

The invention claimed is:

1. An electrostatic actuator comprising:
 a stator that includes a substrate and electrodes provided on the substrate; and
 a movable element disposed on a surface of the stator with the electrodes disposed on the surface,
 wherein the electrostatic actuator further comprises:
 multiple projecting elements equally spaced on a surface of the stator so as to face the movable element or on a surface of the movable element so as to face the stator, the multiple projecting elements being distributed in triangular lattices on the surface of the stator or on the surface of the movable element; and
 a smooth layer formed on the surface of the movable element or the surface of the stator so as to face the multiple projecting elements, wherein all adjacent multiple projecting elements are evenly spaced so as to have smaller in-plane variations in the distribution of the projecting elements.

2. The electrostatic actuator according to claim 1, wherein the multiple projecting elements are multiple linear projecting elements.

3. The electrostatic actuator according to claim 2, wherein the electrodes are a plurality of linear electrodes that are separately provided on the substrate and are arranged in parallel, and
 the linear projecting elements are extended perpendicularly to the plurality of linear electrodes.

4. The electrostatic actuator according to claim 3, further comprising an additional smooth layer at least in a part other than the multiple projecting elements on the surface of the stator or the surface of the movable element.

5. The electrostatic actuator according to claim 2, further comprising an additional smooth layer at least in a part other than the multiple projecting elements on the surface of the stator or the surface of the movable element.

6. The electrostatic actuator according to claim 2, wherein the multiple projecting elements are made of a conductive material.

7. The electrostatic actuator according to claim 3, wherein the multiple projecting elements are made of a conductive material.

8. The electrostatic actuator according to claim 1, wherein the multiple projecting elements are conical elements.

9. The electrostatic actuator according to claim 8, further comprising an additional smooth layer at least in a part other than the multiple projecting elements on the surface of the stator or the surface of the movable element.

10. The electrostatic actuator according to claim 8, wherein the multiple projecting elements are made of a conductive material.

11. The electrostatic actuator according to claim 1, further comprising an additional smooth layer at least in a part other than the multiple projecting elements on the surface of the stator or the surface of the movable element.

12. The electrostatic actuator according to claim 11, further comprising additional smooth layers formed on surfaces of the multiple projecting elements.

13. The electrostatic actuator according to claim 12, wherein the multiple projecting elements are made of a conductive material.

14. The electrostatic actuator according to claim 11, wherein the multiple projecting elements are made of a conductive material.

15. The electrostatic actuator according to claim 1, wherein the multiple projecting elements are made of a conductive material.

16. The electrostatic actuator according to claim 1, wherein the smooth layer is made of carbon-containing silica.

* * * * *